Patented July 6, 1948

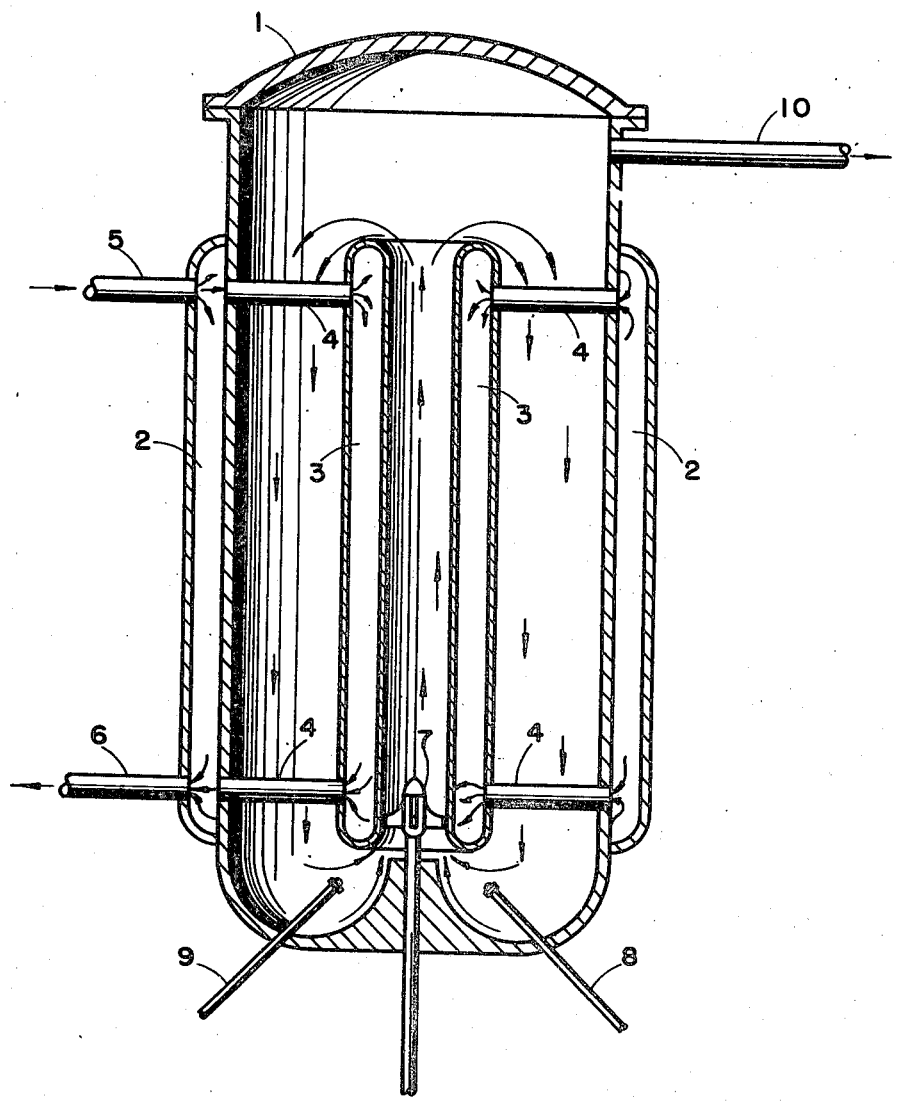

2,444,848

UNITED STATES PATENT OFFICE 2,444,848

CONTINUOUS POLYMERIZATION OF ISOBUTYLENE

Robert L. Purvin, Goose Creek, Tex., assignor to Standard Oil Development Company, a corporation of Delaware Application July 13, 1944, Serial No. 544,669

1 Claim. (Cl. 260—94)

The present invention is directed to catalytic polymerization of unsaturated hydrocarbons and particularly to the polymerization of isobutylene to produce synthetic rubber.

In exothermic catalytic polymerizations of the type referred to, difficulty is encountered in bringing the reaction to a stable condition in which constant feed rates of reaction material and constant operating temperatures and substantially constant conversion rates can be maintained. This difficulty is encountered during the starting-up period of the reactor in which considerable time elapses before the polymerization is actually initiated. It is assumed that this inactive period is caused by the presence of catalyst poisons in the feed and that these poisons must be eliminated by reaction with the catalyst before the latter begins to function in the polymerization of the unsaturated hydrocarbons. These catalyst poisons include, especially when isobutylene and isoprene are polymerized, ethers, water, alcohol, ketones, aldehydes and even the isoprene itself. It is to be understood that no distinction is made between a catalyst poison and an inhibitor since the overall effect of either is to produce a product of inferior quality. By way of explanation, it might be mentioned that water and alcohol are typical poisons while the remaining compounds of the type such as ketones, aldehydes and isoprene inhibit the reaction. This period of inactivity varies with the size of the reactor and may be as long as four hours with a large size commercial reactor.

This starting-up period entails difficulties other than merely the loss of time. It requires especial vigilance on the part of the operator because when the catalyst does begin to function it may be that there will be too much catalyst or too much reactant material in the reactor and this can lead to a loss of control with a resultant runaway of reaction temperature. Furthermore, it often leads to local overheating with the production of sticky polymer which may either clog certain portions of the reactor or may adhere to heat transfer surfaces contributing to loss of temperature control.

In the conventional polymerization of isobutylene to produce synthetic rubber, the reaction is started by feeding a mixture of isobutylene and diluent to the reactor at a controlled rate and simultaneously feeding diluted catalyst to the reactor while agitating the reaction mixture. Ordinarily, the diluent used, both for the catalyst and the reaction material, is an inert liquid of low freezing point, such as methyl chloride. The reaction material is ordinarily introduced in the form of a mixture with methyl chloride containing from 20 to 25, or thereabout, per cent by weight of the olefin. Generally, there is a small amount of diolefin, such as isoprene, included in the feed. At the same time catalyst is fed in at the rate of about 0.04% of the weight of the reaction material diluted with a large volume of methyl chloride. The feed rate of the catalyst is continuously increased until the initial polymerization is indicated by an abrupt rise in temperature. Then the catalyst feed rate is sharply reduced and adjusted until the constant operating temperature and a substantially constant maximum conversion rate are realized.

According to the present invention the starting-up period is substantially decreased and better control is achieved by considerably decreasing the concentration of the olefin in the feed. It is found that if the olefin is fed in admixtures with substantially pure (about 99%) methyl chloride in a mixture containing from 5 to about 10% by weight of the olefin and this mixture is continuously changed by slight increases in the olefin concentration, the inactive period of the catalyst is much shorter than possible heretofore. This is believed to be due in part to the reduction of poison concentration in the diluted feed and in part to the fact that higher catalyst rates may be used in the startup period, since when activity begins there is present considerably less olefin than is the case in the conventional operation and the danger of a temperature run away is accordingly diminished.

In the appended drawing the single figure is a front elevation in diagrammatic form of an apparatus suitable for the practice of the present invention. Numeral 1 designates a reactor which is an elongated cylindrical vessel provided with an external jacket 2 and an internal hollow annulus 3 connected to the jacket by suitable pipes 4. The jacket is supplied with an inlet 5 and outlet 6 for the circulation of a cooling medium. At the bottom of the reactor is an injection nozzle 8 for the introduction of fresh feed and a second injection nozzle 9 for the introduction of catalyst. At the lower end of the annulus is mounted an agitator 7 for circulating the reaction material in the reaction vessel. The upper end of the reactor is provided with one or more overflow pipes 10 which discharge into a flash drum (not shown) for the separation of polymer from unreacted material.

In using this reactor for the production of synthetic rubber from isobutylene, a mixture of isobutylene-isoprene and diluent, such as methyl chloride, is introduced through nozzle 8 until the vessel overflows. At the same time refrigerant is circulated through the cooling system and the agitator 7 is set in motion to facilitate the cooling of the contents of the vessel. When the vessel is full, a uniform feed rate of reactants is established. This may suitably be the rate corresponding to about 2/3 of the capacity of the reactor per hour.

According to the present invention, the composition of the fresh feed at this time is between 5 and 10% by weight of isobutylene, about 0.125-0.250% by weight of isoprene and the remainder methyl chloride of at least 99% purity. The contents of the reactor are brought to a temperature of about −140° F. then catalyst is introduced through nozzle 9. A suitable catalyst mixture contains about 0.1-0.2 weight percent of aluminum chloride in about 99.5% pure methyl chloride. A feed rate of this mixture corresponding to about 1/20 of the feed rate of fresh feed on a weight basis will be suitable at the beginning of the operation. The feed rate of catalyst is increased in increments of about 0.5% by weight of the reactant feed rate until the initiation of polymerization is indicated by a temperature rise. Then the catalyst feed rate is cut back sharply and adjusted for maximum conversion while maintaining constant temperature. It may be noted that, as is common in reactions of this type, the catalyst feed is also chilled to a temperature of −125° F., or lower if possible.

Since the catalyst feed rate is cut back upon the initiation of polymerization, the weight percent of isobutylene in the reactant feed rate is increased as rapidly as possible consistent with maintenance of substantially constant temperature until it constitutes between 20 and 25% by weight of the reactant feed. As the isobutylene content of the feed is increased, the isoprene content is also maintained so that the ratio between them remains substantially constant. The reactor is then in stable operation.

It is understood that particular reference has been made to the polymerization of isobutylene to produce synthetic rubber for illustrative purposes only. The present invention is applicable in the same way to all catalytic polymerizations in which a similar starting-up period is encountered.

The nature and objects of the present invention having been thus described and illustrated, what is claimed as new and useful and is desired to be secured by Letters Patent is:

In the catalytic polymerization of isobutylene in the presence of an aluminum halide in which there is employed an isobutylene feed containing impurities which retard the initiation of polymerization and in which, during stable operation, isobutylene feed containing a predetermined content of isobutylene is continuously introduced into a reactor, aluminum halide is continuously fed into the reactor and product is continuously withdrawn, the reactor at all times containing large quantities of inert diluent, the steps of initiating the reaction by introducing into the reactor an isobutylene feed containing between one-fifth and one-half of the amount of isobutylene maintained in the feed during stable operation, feeding aluminum halide to the reactor until polymerization is initiated, as indicated by an abrupt rise in temperature, and then increasing the content of isobutylene in the feed to that predetermined for stable operation.

ROBERT L. PURVIN.

REFERENCES CITED

The following references are of record in the file of this patent:

UNITED STATES PATENTS

| Number | Name | Date |
|---|---|---|
| 2,269,421 | Arveson | Jan. 13, 1942 |
| 2,317,878 | Bannon | Apr. 27, 1943 |
| 2,379,656 | Ruthruff | July 3, 1945 |